United States Patent
Schoor et al.

(10) Patent No.: US 11,733,368 B2
(45) Date of Patent: Aug. 22, 2023

(54) RADAR SENSOR AND METHOD FOR DETERMINING A RELATIVE SPEED OF A RADAR TARGET

(71) Applicant: Robert Bosch GmbH, Stuttgart (DE)

(72) Inventors: Michael Schoor, Stuttgart (DE); Benedikt Loesch, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 157 days.

(21) Appl. No.: 16/477,104

(22) PCT Filed: Nov. 16, 2017

(86) PCT No.: PCT/EP2017/079406
§ 371 (c)(1),
(2) Date: Jul. 10, 2019

(87) PCT Pub. No.: WO2018/130324
PCT Pub. Date: Jul. 19, 2018

(65) Prior Publication Data
US 2019/0353770 A1   Nov. 21, 2019

(30) Foreign Application Priority Data
Jan. 11, 2017   (DE) .................... 102017200317.0

(51) Int. Cl.
*G01S 13/58* (2006.01)
*G01S 7/02* (2006.01)
(Continued)

(52) U.S. Cl.
CPC ............ *G01S 13/583* (2013.01); *G01S 7/023* (2013.01); *G01S 7/0232* (2021.05);
(Continued)

(58) Field of Classification Search
CPC ........ G01S 13/583; G01S 7/023; G01S 7/354; G01S 13/931; G01S 7/356; G01S 13/343; G01S 7/0232; G01S 7/0234
See application file for complete search history.

(56) References Cited

U.S. PATENT DOCUMENTS 9,354,304 B2 * 5/2016 Kirsch .................. G01S 13/34
2014/0253365 A1   9/2014 Kirsch et al.
2015/0331096 A1 * 11/2015 Schoor ................. G01S 13/584
342/112

FOREIGN PATENT DOCUMENTS

CN    103576139 A    2/2014
CN    104280728 A    1/2015
(Continued)

OTHER PUBLICATIONS

International Search Report for PCT/EP2017/079406, dated Dec. 14, 2017.
(Continued)

*Primary Examiner* — Matthew M Barker
(74) *Attorney, Agent, or Firm* — Norton Rose Fulbright US LLP; Gerard Messina

(57) ABSTRACT

An estimation is described of the speed of objects with the aid of a radar sensor that includes multiple transmitting antennas. Multiple nested sequences of frequency ramps are emitted with the aid of multiple transmitting antennas. An individual phase encoding takes place for each transmitting antenna with the aid of a harmonic code. For estimating the speed of the object, the ambiguities due to the code multiplex are resolved.

11 Claims, 2 Drawing Sheets

(51) Int. Cl.
    *G01S 7/35*      (2006.01)
    *G01S 13/931*    (2020.01)
    *G01S 13/34*     (2006.01)

(52) U.S. Cl.
    CPC ............. *G01S 7/0234* (2021.05); *G01S 7/354* (2013.01); *G01S 7/356* (2021.05); *G01S 13/343* (2013.01); *G01S 13/931* (2013.01)

(56) References Cited

FOREIGN PATENT DOCUMENTS

| | | |
|---|---|---|
| DE | 102013212090 A1 | 1/2015 |
| DE | 102014212280 A1 | 12/2015 |
| DE | 102014212281 A1 | 12/2015 |
| DE | 102014212284 A1 | 12/2015 |
| WO | 2014195046 A1 | 12/2014 |

OTHER PUBLICATIONS

Sun and Lesturgie: "Analysis and Comparison of MIMO Radar Waveforms", 2014 International Radar Conference, IEEE, Oct. 13, 2014, pp. 1-6, XP032746346.

\* cited by examiner

RADAR SENSOR AND METHOD FOR DETERMINING A RELATIVE SPEED OF A RADAR TARGET

FIELD OF THE INVENTION

The present invention relates to a radar sensor and a method for determining a relative speed of a radar target.

BACKGROUND INFORMATION

German Published Patent Application No. 10 2014 212 280 provides a radar measuring method with a frequency modulated continuous wave (FMCW) radar sensor. In particular, it is provided to emit a radar signal having multiple nested sequences of frequency ramps.

German Published Patent Application No. 10 2014 212 284 A1 provides a multiple input/multiple output (MIMO) FMCW radar sensor. The radar signals of the individual transmitting antennas are emitted in the time multiplex method.

The demands on radar sensors in the automotive field are continually increasing. In particular, ever greater accuracy and resolution in the angle determination are required. The MIMO principle allows an improvement here due to the fact that multiple transmitters and receivers are used together for the angle estimation. However, the transmitters are operated in a multiplex method. Time multiplex, code multiplex, or frequency multiplex are possible for this purpose. This allows separation of the transmitters, and with appropriate assignment allows an improvement in the accuracy and resolution.

SUMMARY

The present invention provides a method for determining a relative speed of a radar target, and a radar sensor for determining a relative speed of a radar target.

Accordingly, the following is provided:

A method for determining a relative speed of a radar target. The method encompasses the following steps:

Emitting phase-modulated transmission signals with the aid of multiple transmitting antenna elements. For this purpose, a ramp-shaped frequency-modulated transmission signal having multiple temporally nested sequences of ramps is generated. The ramps within the particular sequence follow one another at a predetermined time interval in a time-delayed manner. The phase of the generated ramp-shaped frequency-modulated transmission signal is phase-modulated for each transmitting antenna element, using a harmonic code.

Receiving signals in response to the emitted phase-modulated transmission signals.

Computing a two-dimensional spectrum for each sequence of the transmission signal via a two-dimensional Fourier transform of baseband signals of the received response signals. The transformation in a first dimension takes place ramp by ramp. In a second dimension the transformation takes place via a ramp index that counts the ramps within the sequence.

Ascertaining values of relative speeds of a radar target which, starting from a peak in one of the computed two-dimensional spectra, are periodic with a predetermined speed period.

Identifying matches in the phase relationship between values of the two-dimensional spectra, at the same positions, with phase relationships to be expected for several of the ascertained values of relative speeds.

Selecting an estimated value of the relative speed of the radar target, based on the identified match of the phase relationship.

Furthermore, the following is provided:

A radar sensor for determining a relative speed of a radar target. The radar sensor includes multiple transmitting antennas and a signal generation device. The signal generation device is designed to generate a ramp-shaped frequency-modulated transmission signal and provide it to the transmitting antennas. The transmission signal has multiple temporally nested sequences of ramps. The ramps within the particular sequence follow one another at a predetermined time interval in a time-delayed manner. The phase of the generated ramp-shaped frequency-modulated transmission signal is phase-modulated for each transmitting antenna element, using a harmonic code. The radar sensor also includes a receiving antenna that is designed to receive a signal in response to the emitted phase-modulated transmission signals, and an evaluation unit. The evaluation unit is designed to ascertain, based on the received response signal, values of relative speeds of a radar target which, starting from a peak in one of the computed two-dimensional spectra, are periodic with a predetermined speed period; to identify matches in the phase relationship between values of the two-dimensional spectra, at the same positions, with phase relationships to be expected for several of the ascertained values of relative speeds; and to select an estimated value of the relative speed of the radar target, based on the identified match of the phase relationship.

Advantage of the Invention

It is a concept of the present invention to encode the phases of the transmission signals for the individual transmission paths of a joint sampling FMCW radar with the aid of code multiplex. In particular, harmonic codes are used for this purpose. This phase modulation with the aid of harmonic codes results in additional ambiguities for the speeds to be estimated. These ambiguities may likewise be resolved.

This allows an estimation of the speed of the radar targets, while at the same time the transmitters may be separated for an angle estimation of the radar targets. Code multiplex has the advantage over time multiplex that no time shift takes place between the transmitters. Therefore, an object movement does not result in a phase shift that is additionally corrected.

According to one specific embodiment, the method encompasses a step for associating a response signal with one of the multiple transmitting antennas. Based on the association, an angle estimation of the detected radar object may take place.

According to one specific embodiment, within a sequence of ramps, the ramps have the same ramp slope and the same difference of the ramp center frequencies. Ramps with the same ramp index in each case have the same ramp slope and the same ramp center frequency in the nested ramps. In particular, the ramp center frequency may be unequal to zero.

According to one specific embodiment, the harmonic code for the phase modulation of the transmission signals for the individual transmitting antennas is adapted as a function of the number of transmitting antennas. For example, an equidistant phase shift may be provided between the individual channels to be encoded.

According to one specific embodiment, the predetermined speed period is formed by using the following speed offset $\Delta v$:

$$\Delta v = \frac{1}{f0} \frac{c}{2\left(1 - \frac{s\_slow}{s\_fast}\right)} \frac{\Delta l}{Tr2r \cdot NTX},$$

where f0 is the average transmission frequency, c is the speed of light, Tr2r is a time interval between two successive ramps of a sequence, NTX is the number of transmitting antennas, s_fast is the ramp slope of a ramp, and s_slow is the slope of the ramp center frequency of a ramp sequence.

According to one specific embodiment of the radar sensor, the receiving antenna includes multiple spatially separate antenna elements. The radar sensor thus forms a so-called multiple input multiple output (MIMO) system with multiple transmission channels and reception channels.

The above embodiments and refinements may be arbitrarily combined with one another if this is meaningful. Further embodiments, refinements, and implementations of the present invention also encompass combinations, not explicitly stated, of features of the present invention described above or to be discussed below with regard to the exemplary embodiments. In particular, those skilled in the art will also add individual aspects as enhancements or supplements to the respective basic form of the present invention.

DETAILED DESCRIPTION

Figure 1:
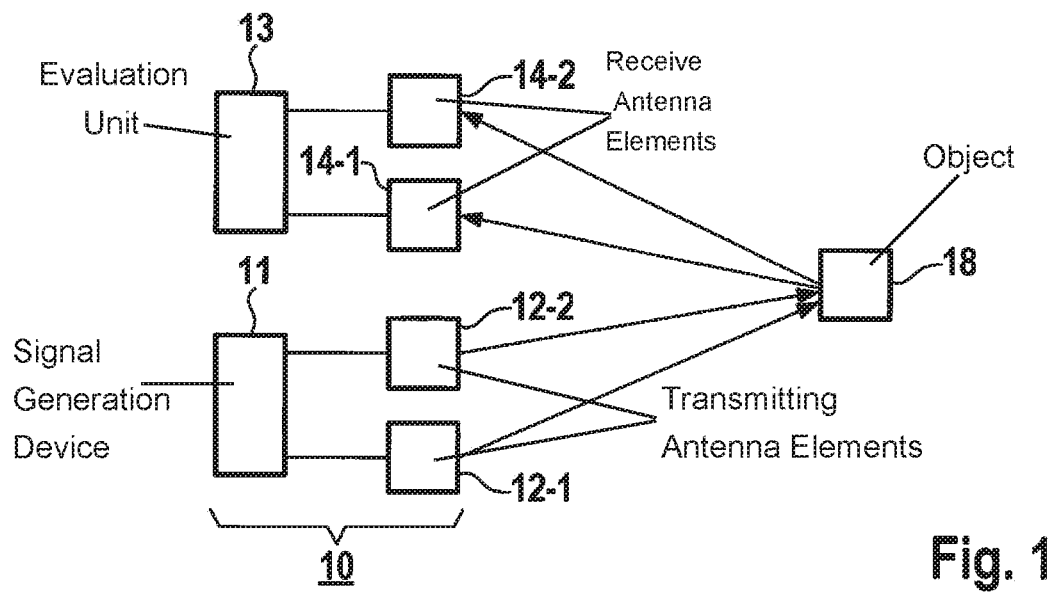
FIG. 1 shows a schematic illustration of a system for determining a relative speed of a radar target according to one specific embodiment.

FIG. 1 shows a schematic illustration of a system with an FMCW radar sensor 10, which in this example includes only two transmitting antenna elements 12-1, 12-2 and two receiving antenna elements 14-1, 14-2. In practice, larger numbers of antenna elements are possible. In particular, more than two transmitting antenna elements 12-1, 12-2 and/or one or multiple receiving antenna element(s) 14-1, 14-2 are possible. Radar sensor 10 may, for example, be installed in the front of a motor vehicle and be provided for measuring distances d, angles, and relative speeds v of objects 18, for example preceding vehicles.

For easier understanding, a bistatic antenna system is illustrated here in which transmitting antenna elements 12-1, 12-2 are different from receiving antenna elements 14-1, 14-2. In practice, a monostatic antenna design may also be utilized in which the same antenna elements are used for transmitting and for receiving.

Transmitting antenna elements 12-1, 12-2 are fed by a signal generation device 11. A transmission signal, explained in greater detail below, is generated in this signal generation device 11. Before the transmission signal is supplied to transmitting antenna elements 12-1, 12-2, the phase of the transmission signal may be individually modulated for each transmitting antenna element 12-1, 12-2.

Noise-like or harmonic codes, for example, are possible to allow the transmission signals to be associated with a transmitting antenna element 12-1, 12-2 in the further processing. In the exemplary embodiment illustrated here, harmonic codes are used for the phase modulation of the transmission signals. In the present context, "harmonic" means that the phase modulation describes a discrete harmonic oscillation. For example, harmonic sequences such as 1, 1, 1, . . . ; 1, −1, 1, −1, . . . ; or 1, j, −1, −j, 1, . . . , or other harmonic frequencies are possible as harmonic codes.

The phase-modulated transmission signals are supplied to the corresponding transmitting antenna elements 12-1, 12-2, so that a corresponding radar signal is emitted by each transmitting antenna element 12-1, 12-2.

The emitted radar signals are reflected on an object 18 and subsequently received by receiving antenna elements 14-1, 14-2. Transmitting antenna elements 12-1, 12-2 and receiving antenna elements 14-1, 14-2 may in each case have identical designs, and in this case have matching visual ranges. For example, transmitting antenna elements and receiving antenna elements 12-1, 12-2, 14-1, 14-2 may in each case be made up of a patch antenna array.

The received signals are downmixed to form baseband signals, and are evaluated in an evaluation unit 13. Within a radar measurement, the frequency of the transmission signal may be modulated with sequences of ascending or descending ramps.

Antenna elements 12-1, 12-2, 14-1, 14-2 may be situated in various positions in a direction in which radar sensor 10 is angle-resolving. In particular, multiple receiving antenna elements 14-1, 14-2, equidistantly situated on a straight line (uniform linear array (ULA)), are necessary for this purpose. The same applies for transmitting antenna elements 12-1, 12-2; transmitting antenna elements and receiving antenna elements 12-1, 12-2, 14-1, 14-2 do not necessarily have to be situated on the same straight line. If radar sensor 10 is to be used for measuring azimuth angles of the objects, the straight lines on which the antenna elements are situated extend horizontally. In contrast, for a sensor for measuring elevation angles, the antenna elements would be situated on vertical straight lines. A two-dimensional antenna array with which azimuth angles as well as elevation angles may be measured is also conceivable.

Figure 2:
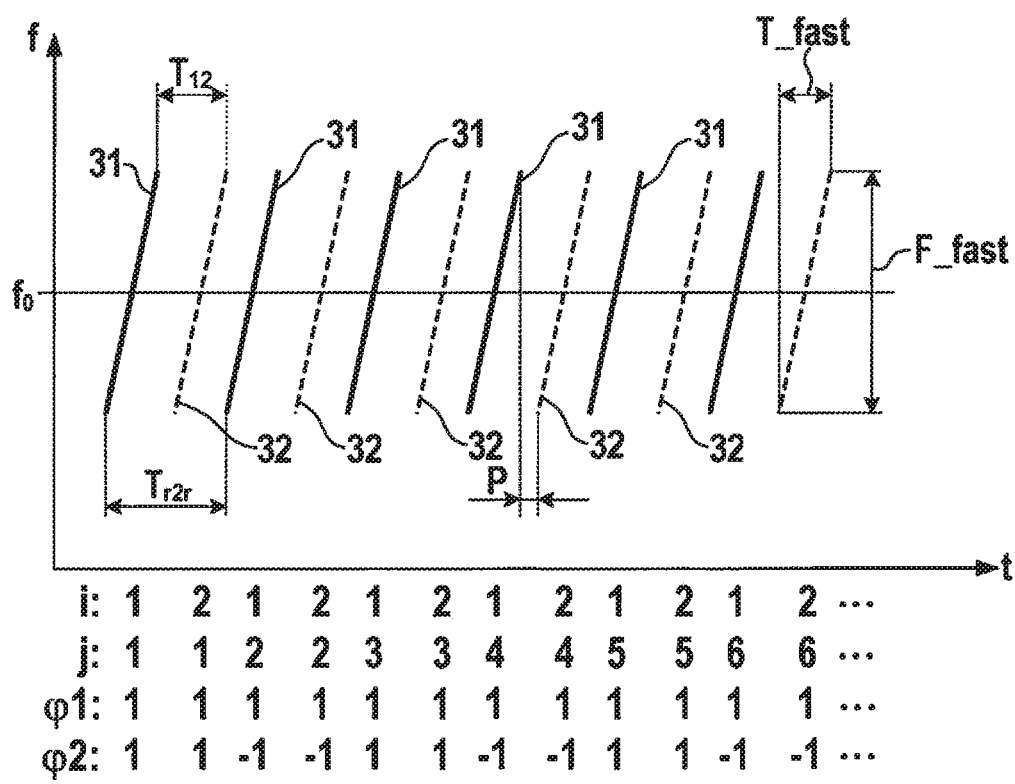
FIG. 2 shows a schematic illustration of a time-frequency diagram of a transmission signal, which is the basis for one specific embodiment.

FIG. 2 shows a diagram for the frequency of ramp sequences 31, 32, of a transmission signal, plotted as a function of time t. During a measurement, each transmitting antenna element 12-1, 12-2 transmits two sequences of ramps with identical ramp parameters that are temporally nested. As described above, the phases of the transmission signals of individual transmitting antenna elements 12-1, 12-2 are phase-modulated based on a harmonic code. The phases of the transmission signals for individual antenna elements 12-1 and 12-2 are indicated by reference symbols $\varphi 1$ and $\varphi 2$ in FIG. 2.

A first sequence 31 of ramps is illustrated by solid lines in FIG. 2, while a second sequence 32 of ramps is illustrated by dashed lines. The number of the sequence to which a ramp belongs is denoted by reference symbol i, and the particular ramp index of the ramp within a sequence is denoted by reference symbol j.

The ramps of second sequence 32 are each shifted with respect to the ramps of first sequence 31, having the same ramp index j, by a time shift T12. Within each sequence 31, 32, the successive ramps are shifted with respect to one another by a time interval Tr2r. Time interval Tr2r is thus the same for both sequences. In addition, a pause P is present in each case between two successive ramps of a sequence.

In the example illustrated in FIG. 2, the difference of the ramp center frequencies of ramps that are successive within a sequence 31, 32 is equal to zero. Therefore, all ramps have the same frequency pattern. The ramp center frequency here corresponds to average transmission frequency f0. In addition, the ramp center frequency of the ramps may also increase or decrease during the emission of a ramp. For example, within a sequence of ramps, successive ramps may have the same difference of the ramp center frequencies. For a time period T_slow of a sequence 31, 32 of ramps and a frequency deviation F_slow of the ramp center frequencies during the entire sequence, ramp slope s_slow of the ramp center frequencies may be described by s_slow=F_slow/T_slow.

In particular, ramps having the same ramp index j in the nested ramps may in each case have the same ramp slope s_slow and the same ramp center frequency.

For the further evaluation, the signals received by a receiving antenna element 14-1, 14-2 are downmixed to the baseband with the aid of the transmission signal generated by signal generation device 11, and further processed in evaluation device 13. Two-dimensional spectra are computed from the baseband signals. For this purpose, each of the baseband signals undergoes a two-dimensional Fourier transform, for example a 2D FFT. The first dimension corresponds to a transformation of the baseband signals that are obtained for the individual ramps. The second dimension corresponds to a transformation over the sequence of ramps, i.e., over ramp index j. The magnitudes of the particular transformations, i.e., the numbers of bins (sampling points or supporting points), are preferably uniform in each case for all spectra for the first dimension and for the second dimension.

Due to relative speed v of a radar target and time shift T12 between the individual sequences of ramps of corresponding partial measurements, a phase difference occurs between the two partial measurements. Phase difference $\Delta\varphi 12$ is given by the following equation, where c is the speed of light and f0 is the average transmission frequency:

$$\Delta\varphi 12 = 2 \cdot \pi \cdot (2/c) \cdot f0 \cdot T12 \cdot v.$$

The phase difference between the two partial measurements is obtained as the phase difference between the complex amplitudes (spectral values) of a peak that occurs at the same position in both two-dimensional spectra. However, due to relatively large time shift T12 between the mutually corresponding ramps of the two sequences 31, 32, determining the phase difference between the two partial measurements does not allow a direct inference concerning relative speed v. This is because, for an individual phase difference, the periodicity of the phases results in ambiguity for the associated value of relative speed v.

A power spectrum is computed in each case from the obtained two-dimensional complex spectra by forming the square of the absolute value of the particular spectral values. The two power spectra are combined into an integrated two-dimensional power spectrum by point-by-point summation or averaging.

The position of a radar target corresponds to a peak in the computed power spectrum. This position is indicated below as bin k, l. This position corresponds to the position of the peak in the individual spectra. A linear relationship between relative speed v and distance d of the radar target is obtained from the first dimension, corresponding to bin k of the position of the peak, according to the FMCW equation $k=2/c(d\,F+f0\,v\,T)$, where c is the speed of light, F is the ramp lift, T is the ramp duration of an individual ramp in one of sequences 31, 32, and f0 is the average transmission frequency. When the frequency difference of successive ramps of a sequence is equal to zero, the position of the peak in second dimension 1 contains only a piece of information concerning relative speed v of the radar target.

There is a linear relationship between relative speed v of the radar object and distance d of the radar object. Since the Doppler frequency that results from the relative motion at speed v is not unambiguously sampled due to relatively large time intervals Tr2r, the piece of information concerning relative speed v of the radar target, obtained from the sampling of the Doppler frequency, is tainted with ambiguity which may be described by the following equation:

$$\Delta v = c/(2 \cdot f0 \cdot Tr2r)$$

In addition to the linear relationship between speed v and distance d, which results according to frequency bin k, periodic values of a possible relative speed v result from frequency bin 1.

The periodic values of relative speed v together with the complex two-dimensional spectra of the partial measurements are taken into consideration for resolution of the ambiguities of the speeds in question. For evaluation of the measured phase difference, a control vector a(v) of an ideal measurement is computed as a function of relative speed v(t) according to the following equation:

$$a(v) = \frac{1}{\sqrt{l}} \begin{bmatrix} 1 \\ \vdots \\ e^{2\pi j(2/c) f0\, T1 i \cdot v} \end{bmatrix},$$

which for two sequences is given as follows:

$$a(v) = \frac{1}{\sqrt{2}} \begin{bmatrix} 1 \\ e^{2\pi j(\frac{2}{c}) f0\, T12 \cdot v} \end{bmatrix},$$

A measurement vector a_m is similarly defined, but instead of the expected speed-dependent complex values, the complex amplitudes (spectral values) at the position of the peak of the computed two-dimensional spectra of the partial measurements are used as components of the vector:

$$\text{a\_m} = \begin{bmatrix} x1(n) \\ \vdots \\ xl(n) \end{bmatrix}.$$

Based on measurement vector a_m and control vector a(v), a normalized likelihood function in the form of a relative speed spectrum S(v) is defined as:

$$S(v) = \frac{1}{|\text{a\_m}^H|^2} |\text{a\_m}^H \cdot a(v)|^2,$$

where superscript H of measurement vector a_m is the Hermitian adjoint vector with respect to measurement vector a_m, i.e., a row vector in which the individual components are the complex conjugate to the components of vector a_m.

Plotting relative speed spectrum S(v) against relative speed v results in a sinusoidal likelihood function whose maxima correspond to the most likely values of parameter v. Relative speed spectrum S(v) by itself is ambiguous. A maximum with a maximum value of 1 corresponds in each case to an optimal match of the ideal phase shifts, which result for relative speed v in question, with the measured phase shift according to the measurement vector.

However, an evaluation of function S(v) is necessary only at the locations that correspond to the periodic values of relative speed v that have been obtained from the evaluations according to the position of the peak in bins k, l. The ambiguity resulting from the position of the peak may thus be resolved with the additional piece of information from the phase relationship. Based on the linear relationship, an estimated value that belongs to the selected estimated value for relative speed v is determined for distance d.

The time signals (baseband signals) corresponding to the different sequences of ramps are initially processed separately. The detection of a radar target takes place in the power spectrum obtained by noncoherent integration. The ambiguity of speed v is then resolved, based on the detection and the complex amplitudes at the position of the peak.

The above statements relate to a conventional radar evaluation without code multiplex for the various transmitting antennas 12-1 and 12-2. The phase encoding of the transmission signals for individual transmitting antennas 12-1 and 12-2 with a harmonic code also results in additional ambiguities, which likewise are resolved. In the case of code multiplex, a transmitter with a corresponding code association experiences a shift in the peaks in the second dimension of the spectrum. For NTX transmitters, this results in NTX peaks in the spectrum. This additional ambiguity is likewise resolved.

Due to the harmonic phase modulation of the transmission signals, a transmitter offset is equivalent to a bin offset in the Doppler dimension. This bin offset is equivalent to an altered estimation of relative speeds v* in question:

$$v^* = \frac{1}{f0}\left(\frac{c}{2T\_fast}k0 - \frac{c}{2\left(1 - \frac{s\_slow}{s\_fast}\right)}\left(\frac{k0}{T\_fast} - \frac{l0}{T\_slow}\right)\right) +$$

$$\frac{1}{f0}\left(\frac{c}{2\left(1 - \frac{s\_slow}{s\_fast}\right)}\left(\frac{\gamma}{Tr2r}\right)\right),$$

where the ambiguities in DV space are taken into account by the integer values of γ.

In one preferred specific embodiment with harmonic codes for NTX transmitters, the transmitter offset corresponds to an 1 bin offset of Δ=N_slow/NTX.

For the speed estimation this results in an offset of:

$$\Delta v = \frac{1}{f0}\frac{c}{2\left(1 - \frac{s\_slow}{s\_fast}\right)}\frac{\Delta l}{T\_slow} = \frac{1}{f0}\frac{c}{2\left(1 - \frac{s\_slow}{s\_fast}\right)}\frac{\Delta ll}{Tr2r \cdot NTX}$$

The speed offset is therefore equivalent to the undersampling that is continued in the Doppler dimension, or in other words, the intervals between the evaluated relative speeds are "filled" via the transmitters.

For determining the relative speed of the radar object, these additional ambiguities due to the code multiplex are now also evaluated.

The described method may also be expanded for carrying out a radar measurement with multiple reception channels of a radar sensor. For each reception channel, a measurement vector a_m(n) is then obtained for the nth channel.

Figure 3:
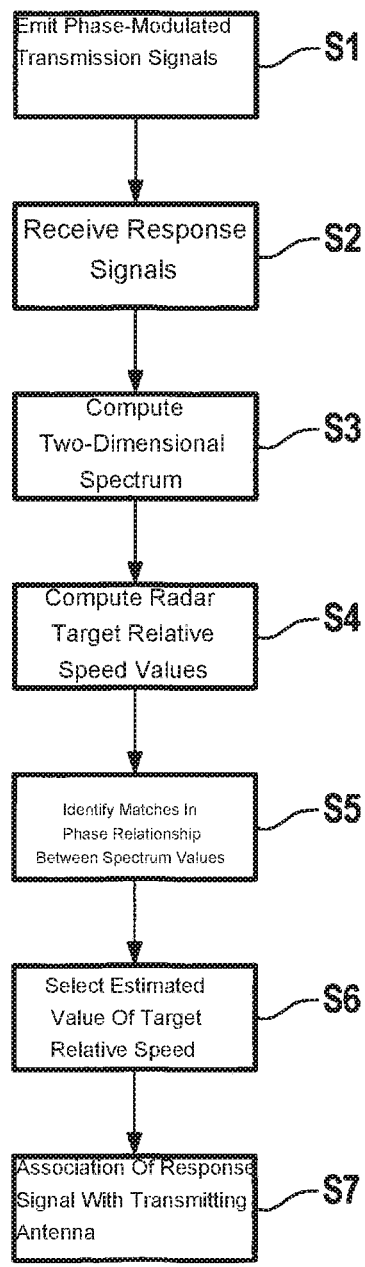
FIG. 3 shows a schematic illustration of a flow chart, which is the basis for a method according to one specific embodiment.

FIG. 3 shows a schematic illustration of a flow chart for a method for determining a relative speed of a radar target according to one specific embodiment. Phase-modulated transmission signals are emitted with the aid of transmitting antenna elements 12-1, 12-2 in step S1. These transmission signals include nested sequences 31, 32 of ramps as described above. The transmission signals are phase-modulated for the individual transmitting antennas 12-1, 12-2, based on a harmonic code.

Signals in response to the emitted phase-modulated transmission signals are subsequently received in step S2. A two-dimensional spectrum for each sequence of the transmission signal is computed in step S3, for example via a two-dimensional Fourier transform of baseband signals of the received response signals. The transformation takes place ramp-by-ramp in a first dimension, and in a second dimension via a ramp index that counts the ramps within the sequence. Values of relative speeds of a radar target which, starting from a peak in one of the computed two-dimensional spectra, are periodic with a predetermined speed period are computed in step S4. The periodicity takes into account in particular the additional ambiguity due to the code multiplex of the transmission signals.

Matches in the phase relationship between values of the two-dimensional spectra, at the same positions, with phase relationships to be expected for several of the ascertained values of relative speeds are identified in step S5. Lastly, an estimated value of the relative speed of the radar target is selected in step S6, based on the identified match of the phase relationship.

An association of a response signal with one of the multiple transmitting antennas may take place in step S7. An angle estimation of the detected radar objects may be carried out after the association of the transmission signals and reception signals with the transmitting antennas and receiving antennas 12-1, 12-2, 14-1, 14-2.

In summary, the present invention relates to the estimation of the speed of objects with the aid of a radar sensor. Multiple nested sequences of frequency ramps are emitted with the aid of multiple transmitting antennas. An individual phase encoding takes place for each transmitting antenna with the aid of a harmonic code. For estimating the speed of the object, the ambiguities due to the code multiplex are resolved.

What is claimed is:

1. A method for determining a relative speed of a radar target, the method comprising:

emitting phase-modulated transmission signals with the aid of multiple transmitting antenna elements, a ramp-shaped frequency-modulated transmission signal that has multiple temporally nested sequences of ramps being generated, wherein ramps within a particular sequence follow one another at a predetermined time interval in a time-delayed manner, and wherein a phase of the generated ramp-shaped frequency-modulated transmission signal is phase-modulated for each transmitting antenna element using a harmonic code;

receiving signals in response to the emitted phase-modulated transmission signals;

computing a two-dimensional spectrum for each sequence of the transmission signal via a two-dimensional Fourier transform of baseband signals of the received response signals, wherein a transformation in a first dimension takes place ramp by ramp, and wherein a transformation in a second dimension takes place via a ramp index that counts the ramps within the sequence;

ascertaining values of relative speeds of a radar target which, starting from a peak in one of the computed two-dimensional spectra, are periodic with a predetermined speed period;

identifying matches in a phase relationship between values of the two-dimensional spectra, at the same positions, with phase relationships to be expected for several of the ascertained values of relative speeds; and selecting, based on the identified match of the phase relationships, an estimated value by selecting-of one of the relative speeds of the radar target by evaluating a relative speed spectrum S(v) at locations that correspond to periodic values of a relative speed v obtained from evaluations according to a position of the peak, wherein based on a linear relationship, the selected estimated value for relative speed v is determined for distance d, and wherein based on measurement vector a_m and control vector a(v), a normalized likelihood function in the form of the relative speed spectrum S(v), is as follows:

$$S(v) = \frac{1}{|a\_m^H|^2}|a\_m^H \cdot a(v)|^2,$$

where superscript H of measurement vector a_m is the Hermitian adjoint vector with respect to measurement vector a_m, which is a row vector in which the individual components are the complex conjugate to the components of vector a_m.

2. The method as recited in claim 1, further comprising: associating one of the received response signals with one of the multiple transmitting antennas.

3. The method as recited in claim 1, wherein within at least one of the sequences of ramps, the ramps have the same ramp slope and the same difference of a ramp center frequencies, wherein ramps with the same ramp index in each case have the same ramp slope and the same ramp center frequency in the nested ramps.

4. The method as recited in claim 1, wherein the harmonic code for the phase modulation of the transmission signals for the individual transmitting antennas is adapted as a function of a number of the transmitting antennas.

5. The method as recited in claim 1, wherein the predetermined speed period is formed using the following speed offset $\Delta v$:

$$\Delta v = \frac{1}{f0}\frac{c}{2\left(1 - \frac{s\_slow}{s\_fast}\right)}\frac{\Delta l}{Tr2r \cdot NTX},$$

where f0 is the average transmission frequency, c is the speed of light, Tr2r is a time interval between two successive ramps of a sequence, NTX is the number of the transmitting antennas, s_fast is the ramp slope of a ramp, and s_slow is the slope of the ramp center frequency of a ramp sequence.

6. A radar sensor for determining a relative speed of a radar target, comprising:

a plurality of transmitting antennas configured to emit phase-modulated and ramp-shaped frequency-modulated transmission signals, wherein the transmission signals include multiple temporally nested sequences, wherein the ramps within a particular sequence follow one another at a predetermined time interval in a time-delayed manner, wherein a phase of the transmission signal is phase-modulated for each of the plurality of transmitting antennas using a harmonic code, and wherein the phase-modulated and ramp-shaped frequency-modulated transmission signals are emitted with the plurality of transmitting antennas; and a receiving antenna for receiving a signal in response to the emitted phase-modulated transmission signals; and a processor configured for performing the following:

ascertaining, based on the received response signal, values of relative speeds of a radar target which, starting from a peak in one of a plurality of computed two-dimensional spectra, are periodic with a predetermined speed period, identifying matches in a phase relationship between values of the two-dimensional spectra, at the same positions, with phase relationships to be expected for several of the ascertained values of relative speeds, and selecting, based on the identified match of the phase relationships, one of the relative speeds of the radar target by evaluating a relative speed spectrum S(v) at locations that correspond to periodic values of a relative speed v obtained from evaluations according to a position of the peak, determining, based on a linear relationship, the selected estimated value for relative speed v for distance d, and determining based on measurement vector a_m and control vector a(v), a normalized likelihood function in the form of the relative speed spectrum S(v), as follows:

$$S(v) = \frac{1}{|a\_m^H|^2}|a\_m^H \cdot a(v)|^2,$$

where superscript H of measurement vector a_m is the Hermitian adjoint vector with respect to measurement vector a_m, which is a row vector in which the individual components are the complex conjugate to the components of vector a_m.

7. The radar sensor as recited in claim 6, wherein the receiving antenna includes multiple spatially separate antenna elements.

8. The radar sensor as recited in claim 6, wherein one of the received response signals is associated with one of the plurality of transmitting antennas.

9. The radar sensor as recited in claim 6, wherein within at least one of the sequences of ramps, the ramps have the same ramp slope and the same difference of a ramp center frequencies, wherein ramps with the same ramp index in each case have the same ramp slope and the same ramp center frequency in the nested ramps.

10. The radar sensor as recited in claim 6, wherein the harmonic code for the phase modulation of the transmission signals for each of the plurality of transmitting antennas is adapted as a function of a number of the plurality of transmitting antennas.

11. The radar sensor as recited in claim 6, wherein the predetermined speed period is formed using the following speed offset $\Delta v$:

$$\Delta v = \frac{1}{f_0} \frac{c}{2\left(1\frac{s\_slow}{s\_fast}\right)} \frac{\Delta l}{Tr2r \cdot NTX},$$

where f0 is the average transmission frequency, c is the speed of light, Tr2r is a time interval between two successive ramps of a sequence, NTX is the number of the plurality of transmitting antennas, s_fast is the ramp slope of a ramp, and s_slow is the slope of the ramp center frequency of a ramp sequence.

* * * * *